UNITED STATES PATENT OFFICE.

CLARK ALVORD, OF WESTFORD, WISCONSIN.

IMPROVEMENT IN HORSE-COLLARS.

Specification forming part of Letters Patent No. 57,457, dated August 28, 1866.

*To all whom it may concern:*

Be it known that I, CLARK ALVORD, of Westford, in the county of Dodge and State of Wisconsin, have invented a new and Improved Mode of Coupling the Tops of Horse-Collars; and I do hereby declare that the following is a full and exact description thereof, reference being had to the accompanying drawings, and to the letters of reference marked thereon.

The nature of my invention consists in providing the upper part of a horse-collar with an elastic coupling placed near the top, as shown in the annexed drawings, (marked A in Figure 1.)

To enable others skilled in the art to make and use my invention I will proceed to describe its construction and operation.

In collars of the usual form I place an elastic coupling, of rubber or other sufficiently elastic substance, from three to four inches from the top, as shown in the annexed drawings at A, Fig. 1, in which position I fasten it by leather straps passing around the collar, and to which the ends of the elastic coupling are fastened, as in Fig. 1 of the annexed drawings.

The advantages of my invention consist in its allowing the collar to be easily expanded to pass over the horse's head, and furnishing an elastic bearing upon the horse's neck.

What I claim as my invention, and desire to secure by Letters Patent, is—

The mode of fastening the tops of horse-collars by an elastic coupling and for the purposes mentioned, as above described and shown.

Dated April 23, 1866.

CLARK ALVORD.

In presence of—
S. M. SMITH,
G. C. FOSTER.